(12) United States Patent
Umeda et al.

(10) Patent No.: US 6,411,016 B1
(45) Date of Patent: Jun. 25, 2002

(54) PIEZOELECTRIC GENERATING APPARATUS

(75) Inventors: Mikio Umeda, Niigata-ken; Yasuhiro Sakai, Tokyo, both of (JP)

(73) Assignee: USC Co., Limited, Tokyo (JP)

( * ) Notice: Subject to any disclaimer, the term of this patent is extended or adjusted under 35 U.S.C. 154(b) by 0 days.

(21) Appl. No.: 09/707,920

(22) Filed: Nov. 8, 2000

(30) Foreign Application Priority Data

Nov. 12, 1999 (JP) .......... 11-322280
May 29, 2000 (JP) .......... 2000-159116

(51) Int. Cl.⁷ .......... H01L 41/04
(52) U.S. Cl. .......... 310/339
(58) Field of Search .......... 310/339, 330, 310/332

(56) References Cited

U.S. PATENT DOCUMENTS

| | | | | |
|---|---|---|---|---|
| 3,940,637 A | * | 2/1976 | Ohigashi et al. | 310/339 |
| 4,523,261 A | * | 6/1985 | West | 310/339 |
| 4,748,366 A | * | 5/1988 | Taylor | 310/328 |
| 4,814,661 A | * | 3/1989 | Ratzlaff et al. | 310/328 |
| 5,188,447 A | * | 2/1993 | Chiang et al. | 362/103 |
| 5,336,959 A | * | 8/1994 | Park et al. | 310/328 |
| 5,554,907 A | * | 9/1996 | Dixon | 310/339 |
| 5,707,215 A | * | 1/1998 | Olney et al. | 417/233 |
| 5,751,091 A | * | 5/1998 | Takahashi et al. | 310/339 |
| 5,814,921 A | * | 9/1998 | Carroll | 310/339 |
| 5,982,304 A | * | 11/1999 | Selker et al. | 341/27 |
| 6,198,205 B1 | * | 3/2001 | Oberlin et al. | 310/339 |
| 6,222,304 B1 | * | 4/2001 | Bernstein | 310/328 |
| 6,252,336 B1 | * | 6/2001 | Hall | 310/339 |

FOREIGN PATENT DOCUMENTS

| | | | |
|---|---|---|---|
| EP | 1 100 189 | * | 5/2001 |
| JP | 11-252944 | * | 9/1999 |
| JP | 11-252945 | * | 9/1999 |
| JP | 11-330582 | * | 11/1999 |
| JP | 11-353913 | * | 12/1999 |

* cited by examiner

*Primary Examiner*—Nestor Ramirez
*Assistant Examiner*—Peter Medley
(74) *Attorney, Agent, or Firm*—Armstrong, Westerman & Hattori, LLP

(57) ABSTRACT

A structure comprises a piezoelectric ceramics plate formed by two plate-shaped piezoelectric ceramics elements which are layered and joined to each other with inverse polarization, in which electricity is generated by beating one or both surface of the piezoelectric ceramics plate. Therefore, an excellent generating efficiency is obtained.

4 Claims, 4 Drawing Sheets

PIEZOELECTRIC GENERATING APPARATUS

BACKGROUND OF THE INVENTION

1. Field of the Invention

The present invention relates to a piezoelectric generating apparatus constructed by using a piezoelectric ceramics element.

2. Description of the Related Art

A piezoelectric material has a variety of applications as a transducer between a mechanical energy and an electrical energy. A large number of materials of both inorganic matter and organic matter are known as a material, which represents a piezoelectric effect, and a piezoelectric ceramics such as PZT (lead zirco-titanate) is a material of currently available in practical use.

The piezoelectric ceramics element is a device having a piezoelectric property caused by applying a DC (direct current) high voltage to a polycrystal so as to produce a residual polarization. Since the piezoelectric ceramics element can vary a basic piezoelectric constant depending on composition, the piezoelectric ceramics element has a wide utilization. The piezoelectric ceramics element of lead zirco-titanate ceramics, especially, has a wide choice range of a composition ratio and a additive and has a variety of application.

FIG. 7 is an illustration of a conventional piezoelectric generating apparatus. This piezoelectric generating apparatus is constructed by a substrate 32 of an acrylic material or the like joined with a piezoelectric ceramics element plate 31, and fixing both end sections of the substrate 32 with a holder 33 made from a hard material such as a metal. Then, a ball 35 made of steel is dropped on the piezoelectric ceramics element plate 31 so as to apply a mechanical impact energy by collision onto the piezoelectric ceramics element plate 31, and a flexural vibration is energized on the piezoelectric ceramics element plate 31 including the substrate 32, thereby picking up an electrical energy.

In spite of the piezoelectric ceramics element of the PZT above described is expected for a practical use, an amount of generated power is little. Therefore, it is a problem that the piezoelectric ceramics element lacks a practical use. Since the substrate 32 and the piezoelectric ceramics element plate 31 are different materials, it is difficult to locate a center of vibration (a position where it does not expand and contract) at a junction surface of the substrate 32 and the piezoelectric ceramics element plate 31. If the center is appeared in the piezoelectric ceramics element plate 31, an efficiency of generation is degraded by producing a cancellation on dielectric polarization.

SUMMARY OF THE INVENTION

In view of the above, the present invention has been attained and an object thereof is to provide a piezoelectric generating apparatus having an excellent generating efficiency with simplified structure.

Another object of the present invention is to provide a piezoelectric generating apparatus having an excellent generating efficiency, which is capable of improving remarkably generating efficiency of the piezoelectric generating apparatus having such a single layered structure, thereby simplifying the structure of such the piezoelectric generating apparatus, making compact so as to be able to utilize in multipurpose, and manufacturing at a low cost.

For solving the technical problem, according to a first aspect of the present invention, there is provided a piezoelectric generating apparatus comprising a piezoelectric ceramics plate formed by two plate-shaped piezoelectric ceramics elements which are layered and joined to each other with inverse polarization, in which electricity is generated by beating at least one surface of the piezoelectric ceramics plate.

In the above aspect, since such a structure is employed that a piezoelectric ceramics plate is formed by two plate-shaped piezoelectric ceramics elements which are layered and joined to each other and it is beat to generate electricity, an effect of obtaining a piezoelectric generating apparatus having an excellent generating efficiency and effective for a small power generation is achieved.

According to a second aspect of the present invention, there is provided a piezoelectric generating apparatus comprising a piezoelectric ceramics plate formed by two plate-shaped piezoelectric ceramics elements which are layered and joined to each other with inverse polarization, and cushion material joined to a center of one surface of the piezoelectric ceramics plate, in which electricity is generated by beating the other surface of the piezoelectric ceramics plate.

According to a third aspect of the present invention, there is provided a piezoelectric generating apparatus comprising a piezoelectric ceramics plate formed by two plate-shaped piezoelectric ceramics elements which are layered and joined to each other with inverse polarization, and cushion material for supporting both ends of the piezoelectric ceramics plate, respectively, in which electricity is generated by beating at least one surface of the piezoelectric ceramics plate.

According to a fourth aspect of the present invention, there is provided a piezoelectric generating apparatus comprising two of the piezoelectric ceramics plates, each joined with the cushion material according to the second aspect, arranged facing each other and further comprising a hard beater provided between the piezoelectric ceramics plates and moved back and forth between the piezoelectric ceramics plates so as to beat each of the piezoelectric ceramics plates.

According to fifth aspect of the present invention, there is provided a piezoelectric generating apparatus comprising the piezoelectric ceramics plate supported and arranged by the cushion material according to the third aspect, and further comprising a hard beater provided on at least one side of the piezoelectric ceramics plate and moved back and forth in the interval with the piezoelectric ceramics plate so as to beat the piezoelectric ceramics plate.

In the second to fifth aspects, since the structure that layered piezoelectric ceramics plates is supported by the cushion material is employed, vibration of the piezoelectric ceramics plates is maintained for a long time and therefore generating efficiency is improved.

Additionally, according to a sixth aspect of the present invention, there is a piezoelectric generating apparatus according to any one of the first to fifth aspects, wherein the two piezoelectric ceramics elements are formed in the same shape. In this aspect, since the layered piezoelectric ceramics plates is formed by using piezoelectric ceramics plates having coincident form, the expansion and the contraction of piezoelectric ceramics elements are performed suitably, therefore generating efficiency is more improved. According to a seventh aspect of the present invention, there is a piezoelectric generating apparatus according to any one of the first to sixth aspects, wherein the piezoelectric ceramics plate has a protector plate attached to on a beat portion, and electricity is generated by beating the protector plate. In this aspect, since the protector plate is attached to the beat portion of the piezoelectric ceramics plates, the piezoelectric ceramics plates is effectively protected against beating.

According to an eighth aspect of the present invention, there is provided a piezoelectric generating apparatus according to any one of the first to seventh aspects, wherein each of the two piezoelectric ceramics elements is formed by joining a plurality of piezoelectric ceramics elements and in layered manner. In this aspect, since each of the piezoelectric ceramics elements is used in a layered junction form, the strength of the piezoelectric ceramics element is maintained effectively. According to a ninth aspect of the present invention, there is provided a piezoelectric generating apparatus according to any one of the first to eighth aspects, wherein material of lead zirco-titanate ceramics is used as the piezoelectric ceramics element. In this aspect, since the material of lead zirco-titanate ceramics is used as the piezoelectric ceramics element, application field as a generating apparatus becomes wide and effective In practical use.

According to a tenth aspect of the present invention, there is provided a piezoelectric generating apparatus comprising a piezoelectric ceramics body formed by joining a piezoelectric ceramics element with a metal plate, capable of generating electricity by applying a collision load to the piezoelectric ceramics element or the metal plate, which is a technical precondition, wherein a structure makes an amount of a distortion of the metal plate being balanced with that of the piezoelectric ceramics element by adjusting a thickness of the metal plate, and sets a center point of vibration, in condition that the piezoelectric ceramics element and the metal plate are joined, at a junction boundary surface of the piezoelectric ceramics element and the metal plate.

In the tenth aspect, since the structure makes an amount of a distortion of the metal plate being balanced with that of the piezoelectric ceramics element by adjusting a thickness of the metal plate, and sets a center point of vibration, in condition that the piezoelectric ceramics element and the metal plate are joined, at a junction boundary surface of the piezoelectric ceramics element and the metal plate, the generating efficiency is improved remarkably, the generating apparatus having outstanding generating efficiency effective for a small power generation can be obtained, and making compact and manufacturing at a low cost can be achieved, because the number of the parts is reduced.

According to an eleventh aspect of the present invention, there is provided a piezoelectric generating apparatus according to the tenth aspect, wherein the ceramics body is supported by a cushion member.

In the eleventh aspect, since the structure that the ceramics body is supported by cushion material, is employed, the vibration of the piezoelectric ceramics body is maintained for a long time, and thereby generating efficiency is improved.

According to a twelfth aspect of the present invention, there is a piezoelectric generating apparatus according to the tenth or eleventh aspect, further comprising a protector plate stuck on a beat surface of the piezoelectric ceramics body and thereby durability can be improved.

In the twelfth aspect, since a protector plate is adhered to a beat surface of the ceramics body, the piezoelectric ceramic device is effectively protected from the collision load of the piezoelectric ceramics body.

According to thirteenth aspect of the present invention, there is a piezoelectric generating apparatus according to any one of the tenth to twelfth aspects, wherein the piezoelectric ceramics element is formed of materials of lead zirco-titanate ceramics.

In the thirteenth aspect, the material formed of lead zirco-titanate ceramics is utilized as the piezoelectric ceramics element, the application field as the generating apparatus is widened and the generating apparatus is effective for the practical use.

DETAILED DESCRIPTION OF THE PREFERRED EMBODIMENTS

This invention will be described hereinafter in detail based on embodiments as shown in attached drawings.

Figure 1:
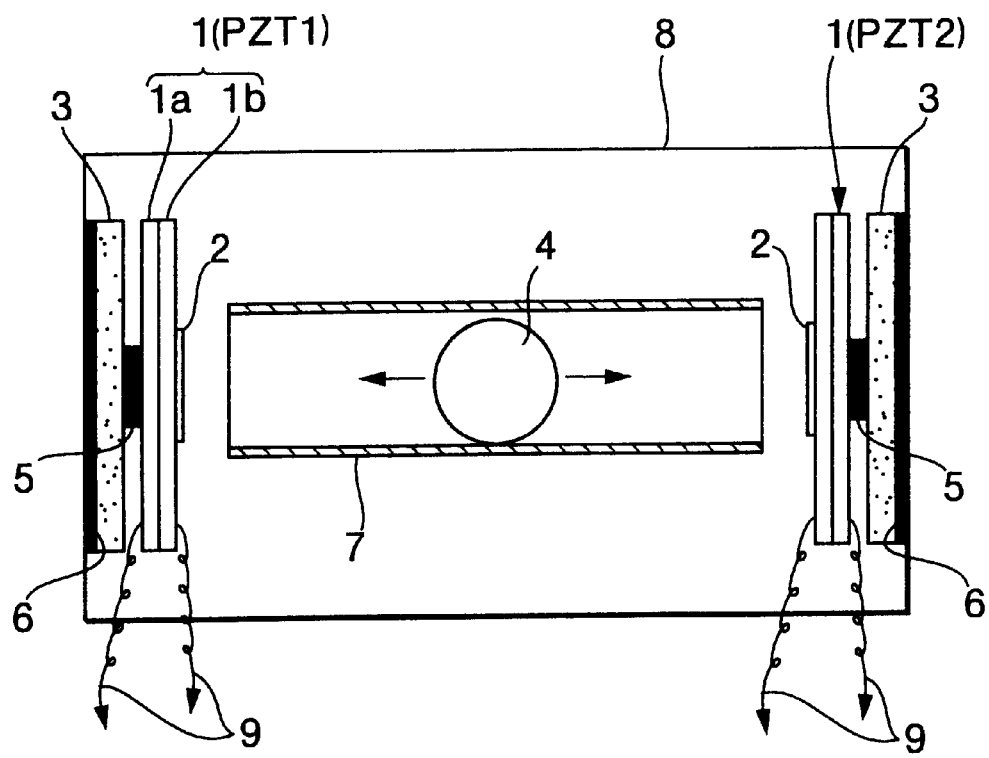
FIG. 1 is a schematic diagram showing a piezoelectric generating apparatus of an embodiment according to the present invention.

Referring to FIG. 1, piezoelectric ceramics plates 1 are disposed at both end sides of the cylindrical container 8 blockaded both ends, and when a steel ball 4 beats these piezoelectric ceramics plates 1, electricity is generated. A cushion plate 3 is stuck to one sidewall of the container 8 by using an adhesive material 6, and a piezoelectric ceramics plate 1 is stuck on only at the center of this cushion plate 3 by using the adhesive material 6. To another sidewall of the container 8, same as above, a piezoelectric ceramics plate 1 is stuck, and thereby both of the piezoelectric ceramics plates 1 are faced each other. On the center of the faced surface of each piezoelectric ceramics plate 1, a protector plate 2 is fixed. A pipe 7 is arranged between both of the piezoelectric ceramics plates 1, and the steel ball 4 which can be rolled freely is provided in the pipe 7.

The piezoelectric ceramics plate 1 is formed by joining two plate-like piezoelectric ceramics elements 1*a* and 1*b* having coincident form (same material, same shape and same thickness), with inverted polarity of the dielectric polarization of the ceramics elements 1*a* and 1*b* each other. Since thus coincidentally formed ceramics elements 1*a* and 1*b* are joined, a flexural vibration is caused around a junction surface as the central point (position where it does not expand and contract). In this case, if the ceramics element 1*a* on the one side is expanded, the ceramics element 1*b* on the other side is contracted, and the polarities of output voltages are the same direction, and the both piezoelectric ceramics elements 1*a* and 1*b* are connected in series, in the electric generation structure.

When the flexural vibration is occurred centering on the junction surface, both operations of expansion and contraction are performed on one piezoelectric ceramics element 1a (or 1b) and the generation of electricity is effectively performed without cancellation of the polarization. A generated current as an electrical energy is picked out through lead wires 9.

In this case, the two piezoelectric ceramics elements 1a and 1b are layered or stacked, but each piezoelectric ceramics element 1a (or 1b) can be formed in a layered or stacked manner. In this layered structure, a plurality of thin piezoelectric ceramics plates (in this case, polarities of the polarization are the same) are joined and layered, and thereby one piezoelectric ceramics element 1a (or 1b) is formed. Thus, because of the layered structure, if the piezoelectric ceramics plates are joined with the adhesive having elastic property, for example, piezoelectric ceramics plates of material lack of strength become easy to bend, based on an elastic effect of the adhesive, and maintain a bending strength. The ceramics plate becomes resistant to bend by thickness being thin. As an outline shape of piezoelectric ceramics plate 1 is not limited, a circular shape, an elliptic shape, a triangular shape, a quadrilateral shape, a polygonal shape or the like may be selected.

The cushion plate 3 may be made of soft material synthetic resins, rubbers or sponges. The reason why such the cushion plate 3 is used and piezoelectric ceramics plate 1 is fixed at the center of the cushion plate 3 by using the adhesive 5, is for preventing from decrease of the vibration of the piezoelectric ceramics plate 1. When the piezoelectric ceramics plate 1 vibrates, a member supporting the piezoelectric ceramics plate 1 becomes a factor of decreasing the vibration of the piezoelectric ceramics plate 1. To remove the factor of decreasing, the piezoelectric ceramics plate 1 is in condition as much as free by using the cushion plate 3.

By using the cushion plate 3, since a natural vibration of the piezoelectric ceramics plate 1 is maintained for a long time, the generating efficiency is improved. The cushion member also absorbs the impact which is applied on the piezoelectric ceramics plate 1. The protector plate 2 is made of metal, synthetic resin or the like, and it protects the piezoelectric ceramics plate 1 from the beating by the steel ball 4.

If the piezoelectric generating apparatus is arranged under circumstances of the predetermined motional condition utilizing wind, wave or the human action, the steel ball 4 rolls down and up, and beats the both of right and left sides piezoelectric ceramics plate 1 so as to apply an impact energy by the collision. Then the vibration is energized on piezoelectric ceramics plate 1, the piezoelectric ceramics plate 1 is repeatedly expanded and contracted, and therefore the piezoelectric ceramics plate 1 generates an alternating current electricity.

In the above embodiment, since the steel ball 4 as a beater is positioned in the pipe 7 and beats the piezoelectric ceramics plate 1, material and shape are not limited to the steel ball, other column shaped, egg-shaped or the like massive material may be utilized. Not limited to the pipe 7, if the member with which the beater can moved freely, such a situation may be embodied that the beater moves along a rail. The spring member (arranged upwardly or downwardly) may be used instead of the pipe 7. In this formation, one end of the spring member being fixed, the steel ball 4 being fitted on the other end of the spring, and therefore the steel ball beats the piezoelectric ceramics plate 1 on both sides by the swing toward right and left of the spring member.

Figure 2:
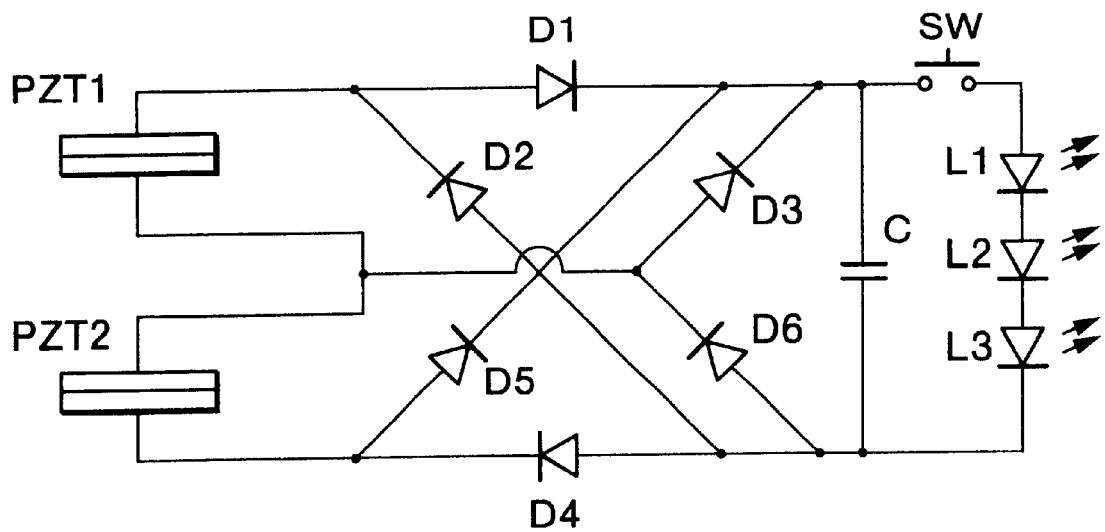
FIG. 2 is a circuit diagram of the same charger apparatus.

FIG. 2 shows a circuit of a charger apparatus used with the above described piezoelectric generating apparatus and for charging the electricity generated by the generation apparatus. The charger apparatus comprises a PZT1 and a PZT2 as the two piezoelectric ceramics plates 1, a rectifying diodes D1–D6, a capacitor C for storing electricity, switch SW, and light emitting diodes L1–L3. The electricity generated by the PZT1 is full-wave rectified by the diodes D1–D3, and the electricity generated by the PZT2 is full-wave rectified by the diodes D4–D6. These electricity rectified in full-wave form is charged into the capacitor C. Then the capacitor C discharges by an operation of the switch SW and turns on the light emitting diode L1–L3.

Figure 3:
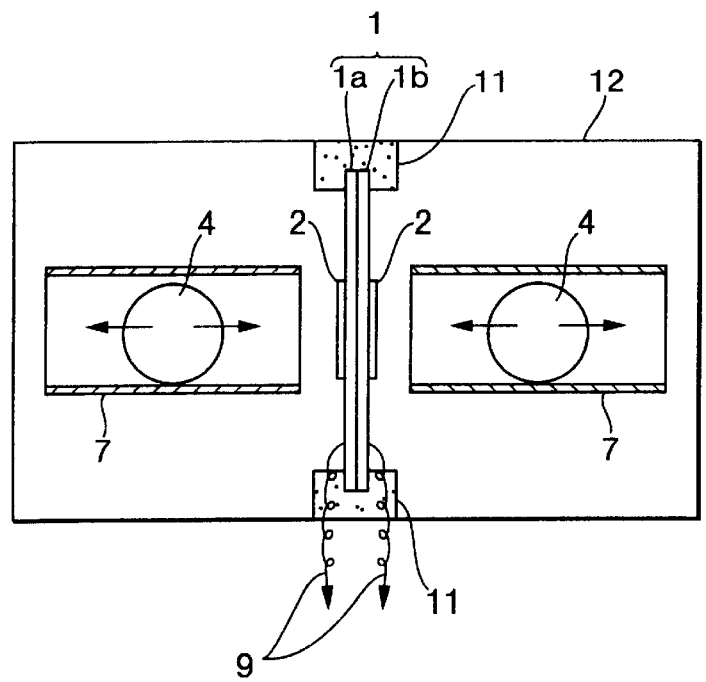
FIG. 3 is a schematic diagram showing a piezoelectric generating apparatus using one piezoelectric ceramics plate of another embodiment according to the present invention.

FIG. 3 shows an embodiment of a piezoelectric generating apparatus using a piezoelectric ceramics plate 1. This piezoelectric generating apparatus uses a cylindrical container 12 with both ends blockaded, cushion members 11 are arranged at upper inside surface and lower inside surface at a center portion of the container, and the piezoelectric ceramics plate 1 (1a and 1b) is supported by the cushion members 11 with engaging in recesses of the cushion members 11. Protector plates 2 are fixed on both side of the piezoelectric ceramics plate 1. The pipes 7 are arranged on both sides of the piezoelectric ceramics plate 1, respectively, and inside of the pipes 7 steel balls 4 movable freely are provided. Materials of the cushion members 11 are the same as the cushion plate 3, and the other members are the same as above described.

If the piezoelectric generating apparatus is arranged under circumstances of the predetermined motional condition, the steel balls roll down and up inside the pipes 7, and beats the piezoelectric ceramics plate 1 alternatively so as to energize vibration on piezoelectric ceramics plate 1, the piezoelectric ceramics plate 1 is repeatedly expanded and contracted, and therefore the piezoelectric ceramics plate 1 generates an alternating current electricity.

Figure 4:
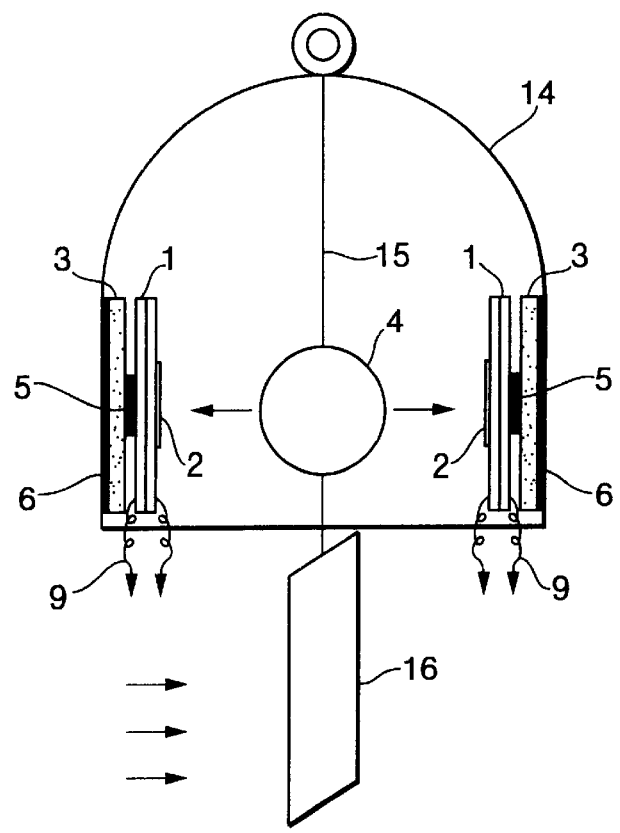
FIG. 4 is a schematic diagram showing a piezoelectric generating apparatus in a wind-bell form of still another embodiment according to the present invention.

FIG. 4 shows an embodiment of a piezoelectric generating apparatus shaped such as a wind-bell. In this piezoelectric generating apparatus, piezoelectric ceramics plates 1 are fixed at two positions (three positions or more may be available) of internal circumference surface of a cup-shaped container 14 with facing each other. When fixing, the cushion plate 3 is stuck on an internal circumference surface of the container 14 and piezoelectric ceramics plate 1 is stuck on only at the center of the cushion plate 3 by using an adhesive 5. Then the piezoelectric ceramics plate 1 also is installed on the facing surface of the container 14. The protector plates 2 are stuck on at the center of the facing surfaces of the both piezoelectric ceramics plates 1.

Then, the steel ball 4 is hung inside of the container 14 by a string 15 and a flat member 16 is hung from the steel ball 4. Materials of each member are as above described. If the piezoelectric generating apparatus is arranged under circumstances of the wind, the steel balls swing and beat the piezoelectric ceramics plates 1, and therefore the piezoelectric ceramics plate 1 generates alternating current electricity.

Figure 5:
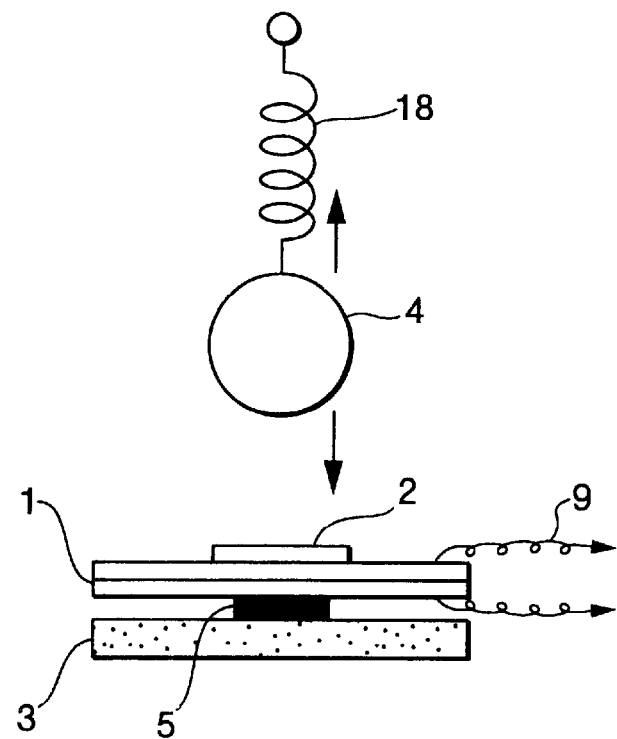
FIG. 5 is a schematic diagram showing a piezoelectric generating apparatus using a spring member of further embodiment according to the present invention.

FIG. 5 shows an embodiment of piezoelectric generating apparatus used with a spring member. In this piezoelectric generating apparatus, a steel ball 14 is hung by using a spring member 18, a cushion plate 3 is arranged below them, a piezoelectric ceramics plate 1 is fixed only at the center of the cushion plate 3 by using an adhesive 5, and a protector plate 2 is fixed at the center of the piezoelectric ceramics plate 1. Materials of each member are as above described. If the piezoelectric generating apparatus is arranged under circumstances of the predetermined motional condition, the steel ball 4 beats repeatedly the piezoelectric ceramics plate 1 by expansion and contraction movement of the spring member 18, and therefore the piezoelectric ceramics plate 1 is energized with vibration so as to generate electricity.

Further the piezoelectric generating apparatus in a pinwheel shaped can be embodied. In this pinwheel shaped piezoelectric generating apparatus, piezoelectric ceramics plates 1 are fixed on radially formed surfaces by using cushion plates 3 and adhesives 5 as described above. Then, the pinwheel is rotated by utilizing such as force of wind, and the rotated piezoelectric ceramics plates 1 are beat one by one by a steel ball 4 which is fixed movably one end of such as a spring member. A variety of piezoelectric generating apparatuses are considered other than described above.

Therefore, piezoelectric generating apparatus according to the embodiments described above can improve generating efficiency by forming piezoelectric ceramics plate 1 with layered plate shaped piezoelectric ceramics elements and are effective as charger apparatus or a power supply of a light emitting apparatus. Since the piezoelectric generating apparatus is simply structured and is economical, the piezoelectric generating apparatus is expected for practical use. For example, if the piezoelectric generating apparatus is provided on a bicycle or shoes and turns on a light emitting diode, it is utilized as a tool to be recognized of existing at night. If the piezoelectric generating apparatus is provided on watch or a portable telephone powered by a battery, piezoelectric generating apparatus can be utilized substituted for a battery or can be utilized for measures of death of a battery. Further, it is expected that the piezoelectric generating apparatus can be used for turning on a buoy by utilizing pitching and rolling by wave.

Figure 6:
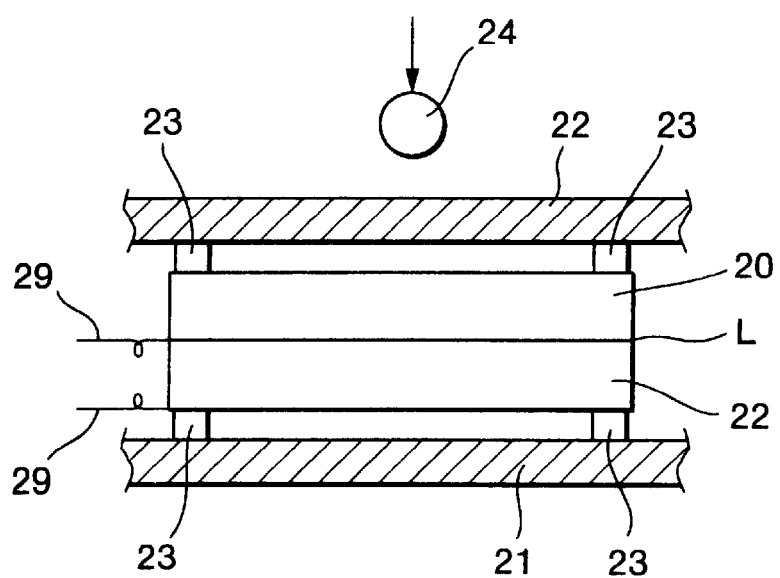
FIG. 6 is a schematic diagram showing a piezoelectric generating apparatus of another embodiment according to the present invention.
Figure 7:
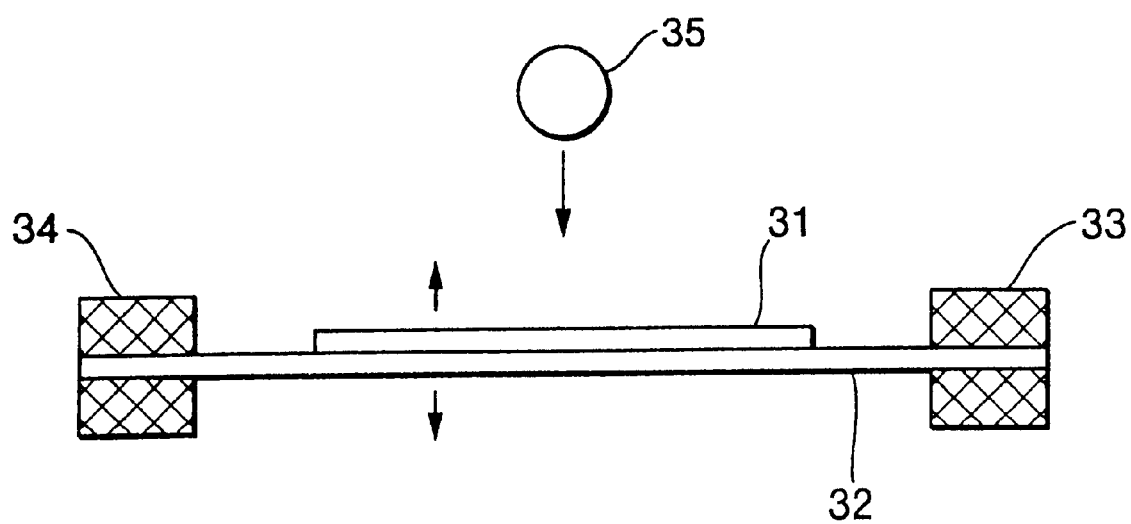
FIG. 7 is a schematic diagram showing a conventional piezoelectric generating apparatus.

FIG. 6 shows a schematic construction of a piezoelectric generating apparatus according to the present invention. The piezoelectric generating apparatus comprises a metal substrate 10 joined with a piezoelectric ceramics device plate 22, in this embodiment, each of both ends of the piezoelectric ceramics device plate 22 are fixed on a cushion member 21 by soft members 23 such as a double stick tape. Of course, the soft member 23 and the cushion member 11 may be provided on the side of the metal substrate 20 and the side of the piezoelectric ceramics device plate 22 may be beat by the steel ball 24.

The metal substrate 20 is set in the amount of distortion being balanced with that of the piezoelectric ceramics element 12 by adjusting a thickness of the metal substrate 20, and a center point L of vibration, in condition that the piezoelectric ceramics element 22 and the metal substrate 20 are joined, is set at a junction boundary surface of the piezoelectric ceramics element 22 and the metal substrate 20.

Thus, in this embodiment, since the vibration occurred in the piezoelectric ceramics device 22 is not cancelled by colliding a steel ball 24 to one of the metal substrate 20, applying an impact energy by a collision to the piezoelectric ceramics device 22, and thereby energizing a flexural vibration to the piezoelectric ceramics body A including the substrate 20, the most of the flexural vibration, centered on the junction boundary surface where the central point L of the vibration exists, can be extracted as an electrical energy. A generated current as an electrical energy is picked out through lead wires 29.

In this embodiment, a protector plate (not shown), formed by such as metal or synthetic resin, can be fixed on, so as to improve durability if the steel ball 24 is beat on the piezoelectric ceramics body 22.

As an outline shape of piezoelectric ceramics plate 1 is not limited, a circular shape, an elliptic shape, a triangular shape, a quadrilateral shape, a polygonal shape or the like may be selected as a frontal view.

The cushion member 21 may be made of soft material such as synthetic resins, rubbers or sponges. Using such the cushion member 21, decreasing of the vibration of the piezoelectric ceramics body A is prevented. When the piezoelectric ceramics body A vibrates, a member supporting the piezoelectric ceramics body A becomes a factor of decreasing the vibration of the piezoelectric ceramics body A. To remove the factor of decreasing, the piezoelectric ceramics body A is in condition as much as free by using the cushion member 21, preferably.

By using the cushion member 21, since a natural vibration of the piezoelectric ceramics body A is maintained for a long time, the generating efficiency is improved. The cushion member 21 also absorbs the impact which is applied on the piezoelectric ceramics body A.

If such the piezoelectric generating apparatus is arranged under circumstances of the predetermined motional condition utilizing wind, wave or the human action, an impact energy by the collision acting on the piezoelectric ceramics body A is applied. Then the vibration is energized on piezoelectric ceramics body A, the piezoelectric ceramics body A is repeatedly expanded and contracted, and therefore the piezoelectric ceramics body A generates alternating current electricity.

If the piezoelectric generating apparatus is used and the one intends to charge the electricity generated by the generating apparatus, the charger apparatus (not shown, especially) comprises a PZT as the piezoelectric ceramics element 22, a required number of rectifying diodes, a capacitor for storing electricity, switch, and a required number of light emitting diodes. The electricity generated by the PZT is full-wave rectified by the diodes. The electricity rectified in full-wave form is charged into the capacitor. Then the capacitor discharges by an operation of the switch and turns on the light emitting diodes.

The piezoelectric generating apparatus according to the embodiments, as described above, since the piezoelectric ceramics elements 22 is single layered, there is no fear of the cancellation of the vibration generated in the piezoelectric ceramics elements 22, and most of the flexural vibration occurred around the junction surface of the central point L of the vibration can be extracted efficiently as the electrical energy, the structure as the generating apparatus is simplified remarkably, the whole of the apparatus can be compact, and the manufacturing cost can be decreased, thereby the practical use is developed. For example, if this piezoelectric generating apparatus is provided on a bicycle or shoes and turns on a light emitting diode, it is utilized as a tool to be recognized of existing at night. If the piezoelectric generating apparatus is provided on watch or a portable telephone powered by a battery, piezoelectric generating apparatus can be utilized substituted for a battery or can be utilized for measures of death of a battery. Further, it is expected that the piezoelectric generating apparatus can be used for turning on a buoy by utilizing pitching and rolling by wave. Further, it can be constructed that charging is continued until reached at the predetermined voltage, when the voltage is reached at the predetermined voltage, the charged electrical energy is discharged at a stroke.

What is claimed is:

1. A piezoelectric generating apparatus comprising a piezoelectric ceramics plate formed by two plate-shaped piezoelectric ceramics elements which are layered and joined to each other with inverse polarization, and a cushion member joined to a center of one surface of said piezoelectric ceramics plate, in which electricity is generated by beating the other surface of said piezoelectric ceramics plate.

2. A piezoelectric generating apparatus comprising two of said piezoelectric ceramics plates, each joined with said cushion material, according to claim 1, arranged facing each other, and further comprising a hard beater provided between said piezoelectric ceramics plates and reciprocated between said piezoelectric ceramics plates so as to beat each of said piezoelectric ceramics plates.

3. A piezoelectric generating apparatus comprising a piezoelectric ceramics plate formed by two plate-shaped piezoelectric ceramics elements which are layered and joined to each other with inverse polarization, and cushion material for supporting both ends of said piezoelectric ceramics plate, respectively, in which electricity is generated by beating at least one surface of said piezoelectric ceramics plate.

4. A piezoelectric generating apparatus comprising said piezoelectric ceramics plate supported and arranged by said cushion material, according to claim 3, and further comprising a hard beater provided on at least one side of said piezoelectric ceramics plate and reciprocated relative to said piezoelectric ceramics plate so as to beat said piezoelectric ceramics plate.

\* \* \* \* \*